US008819110B2

(12) United States Patent
Jin

(10) Patent No.: US 8,819,110 B2
(45) Date of Patent: Aug. 26, 2014

(54) SYSTEM AND METHOD FOR REAL-TIME DATA TRANSMISSION USING ADAPTIVE TIME COMPRESSION

(75) Inventor: Xin Jin, Waterloo (CA)

(73) Assignee: BlackBerry Limited, Waterloo (CA)

(*) Notice: Subject to any disclaimer, the term of this patent is extended or adjusted under 35 U.S.C. 154(b) by 454 days.

(21) Appl. No.: 11/735,675

(22) Filed: Apr. 16, 2007

(65) Prior Publication Data
US 2008/0253311 A1 Oct. 16, 2008

(51) Int. Cl.
*G06F 15/16* (2006.01)
*H04L 29/08* (2006.01)
*H04L 29/06* (2006.01)

(52) U.S. Cl.
CPC .......... *H04L 29/08072* (2013.01); *H04L 29/06* (2013.01)
USPC ............ 709/203; 709/220; 709/227; 370/236

(58) Field of Classification Search
CPC .................. H04L 29/06; H04L 29/08072
USPC .............. 370/232, 311, 320, 332, 335, 236; 455/343.5, 522, 572, 574; 709/227, 709/232, 235, 247, 228, 230, 220, 224
See application file for complete search history.

(56) References Cited

U.S. PATENT DOCUMENTS

| 5,689,440 | A | * | 11/1997 | Leitch et al. | 370/313 |
| 5,923,650 | A | * | 7/1999 | Chen et al. | 370/331 |
| 6,075,768 | A | | 6/2000 | Mishra | |
| 7,000,025 | B1 | * | 2/2006 | Wilson | 709/235 |
| 7,944,839 | B2 | * | 5/2011 | Siris | 370/236 |
| 7,965,761 | B2 | * | 6/2011 | Shattil | 375/147 |
| 2004/0002366 | A1 | * | 1/2004 | Cromer et al. | 455/574 |
| 2004/0071086 | A1 | * | 4/2004 | Haumont et al. | 370/230 |
| 2004/0160979 | A1 | | 8/2004 | Pepin | |
| 2005/0003824 | A1 | * | 1/2005 | Siris | 455/452.1 |
| 2005/0059421 | A1 | * | 3/2005 | Reed et al. | 455/522 |

(Continued)

FOREIGN PATENT DOCUMENTS

| EP | 1033849 A1 | * | 9/2000 |
| EP | 1 580 914 A | | 9/2005 |

(Continued)

OTHER PUBLICATIONS

Author: Hakki Gokhan Ilk; Title: "Adaptive time scale modification of speech for graceful degrading voice quality in congested networks for VoIP applications" Date: Jun. 23, 2005.*

(Continued)

*Primary Examiner* — Khanh Dinh

(57) ABSTRACT

A system and method is provided for real-time data transmission using adaptive time compression that is based on an estimation of network load, one or more media properties of the real-time data, and/or a battery level of the mobile device. A first embodiment provides a mobile device operable to transmit real-time data using the adaptive time compression. Another embodiment provides a wireless network operable to transmit real-time data using the adaptive time compression. Another embodiment provides a wireless network operable to determine a time compression ratio, which is used for the adaptive time compression. The time compression ratio might be sent to the mobile device for use by the mobile device in up (reverse) link transmission, or by the mobile device in down (forward) link reception, or both. Another embodiment provides a mobile device operable to enter a low power consumption mode while not actively transmitting or receiving.

26 Claims, 12 Drawing Sheets

(56) References Cited

U.S. PATENT DOCUMENTS

| | | | |
|---|---|---|---|
| 2005/0120128 A1* | 6/2005 | Willes et al. | 709/232 |
| 2005/0164645 A1 | 7/2005 | Li et al. | |
| 2005/0201414 A1* | 9/2005 | Awais | 370/468 |
| 2005/0255893 A1* | 11/2005 | Jin et al. | 455/572 |
| 2006/0114827 A1* | 6/2006 | Harris et al. | 370/232 |
| 2006/0277322 A1* | 12/2006 | Liu | 709/246 |
| 2007/0004376 A1* | 1/2007 | Kogure | 455/343.5 |
| 2007/0174465 A1* | 7/2007 | Huang et al. | 709/227 |

FOREIGN PATENT DOCUMENTS

| | | |
|---|---|---|
| EP | 1580914 | 9/2005 |
| EP | 1 708 400 A | 10/2006 |
| EP | 1708400 | 10/2006 |
| EP | 1021001 B1 | 3/2007 |
| WO | WO 2005002086 A1 * | 1/2005 |
| WO | 2006060036 | 6/2006 |
| WO | WO 2006/060036 A | 6/2006 |

OTHER PUBLICATIONS

Goodman, D.J. et al., "Quality of Service and Bandwidth Efficiency of Cellular Mobile Radio with Variable Bit-rate Speech Transmission", *Vehicular Technology Conference*, 1983, 3$^{rd}$ IEEE, vol. 33:316-321, May 27, 1983.

Anonymous, "Real time control protocol", *Internet Article [Online]*, Mar. 21, 2007, URL:http://en.wikipedia.org/w/index.php?title=Real_time_control_protocol&oldid=116731244, retrieved Aug. 6, 2007.

Liwei He, Anoop Gupta, "Exploring Benefits of Non-Linear Time Compression", *Internet Article [Online]*, URL:http://research.microsoft.com/users/1he/papers/acmmm01.nltc.pdf, retrieved Aug. 6, 2007.

André Pagnac, "Why Video Shouldn't Kill the Communication", *Internet Article [Online]*, Jan. 2007, URL:http://www.actimagine.com/press_release/2007_01_Actimagine_WhyVideo_OpinionPiece.pdf, retrieved Aug. 29, 2007.

"3$^{rd}$ Generation Partnership Project; Technical Specification Group Radio Access Network; Continuous Connectivity for Packet Data Users; (Release 7)", 3GPP TR 25.903 V0.3.1, Mar. 2006.

"3$^{rd}$ Generation Partnership Project; Technical Specification Group Radio Access Network; Continuous Connectivity for Packet Data Users; (Release 7)", 3GPP TR 25.903 V1.2.1, Feb. 2007.

Summons to Attend Oral Proceedings dated Sep. 26, 2011 from corresponding European Patent Application No. 07106254.1.

Extended European Search report dated Nov. 9, 2011 from corresponding European Divisional Application No. 11168545.9.

David Salomon "Data Compression: the complete reference", 1998, Springer, XP000002658039, pp. 50-51.

Michael Alwine: "Method of Reducing Data Mode Transmitter Turn-On Time in Voice/Data Capable Land Mobile Radios", Ip.Com Journal, Ip.Com Inc., Jan. 30, 2002, XP013001848, ISN: 1533-0001.

Goodman, D.J.; Sundberg, C.-E.: "Quality of Service and Bandwidth Efficiency of Cellular Mobile Radio with Variable Bit-rate Speech Transmission", Vehicular Technology Conference, 1983. 33RD IEEE, vol. 33, May 27, 1983, pp. 316-321, XP002445766.

Anonymous: "Real Time Control Protocol", Internet Article Mar. 21, 2007, XP002445767, Retrieved from internet: URL: http://en.wikipedia.org/w/index.php?title=Realtime_control_protocol&oldid=116731244 [retrieved on Aug. 6, 2007].

Liwei He, Anoop Gupta: "Exploring Benefits of Non-Linear Time Compression", Internet Article 2001, XP002445798, Retrieved from the internet: URL: http://research.microsoft.com/users/1he/papers/acmmm01.nltc.pdf [retrieved on Aug. 6, 2007].

Andre Pagnac: "Why Video Shouldn't Kill the Communication", Internet Article, Jan. 2007, XP002457033, Retrieved from the internet: URL: http://www.actimagine.com/press_release/2007_01_Actimagine_WhyVideo_OpinionPiece.pdf [retrieved on Oct. 29, 2007] p. 2, line 18-line 22.

Salomon, "Data Compression: the complete reference", 1997, Springer, p. 50.

Partial European Search Report dated Sep. 14, 2011 from corresponding European Patent Application No. 11168545.9.

David Salomon: "Data Compression: the complete reference", 1998, Springer, XP000002658039, pp. 50-51.

Office Action dated Jul. 17, 2013 from corresponding Canadian Patent Application No. 2,629,161.

* cited by examiner

SYSTEM AND METHOD FOR REAL-TIME DATA TRANSMISSION USING ADAPTIVE TIME COMPRESSION

FIELD OF THE APPLICATION

The application relates to wireless communication systems, and more particularly to real-time data transmission using adaptive time compression.

BACKGROUND

In the evolution of wireless air interface standards, an objective has been optimizing for the best interest of carriers, such as maximizing the network capacity, or carrier's revenue. There are examples where such evolution has been achieved through sacrificing end user's interest, such as terminal's battery life. Examples include, 2G CDMA IS95 standard evolved into 2.5G IS2000, and 2G GSM/GPRS evolved into 3G W-CDMA/UMTS. In both cases the handset user's battery life decreased significantly.

On the other hand, although the air interface standards have been evolving with a goal of maximizing overall network capacity, in reality, the wireless network is not always operating in full load (or maximum capacity) all the time and at all the locations. Most of the time and/or at most locations, the load levels are lower than the full capacity, and the unused capacity is wasted.

One reason that IS95 and GSM/GPRS handsets have much longer talk time than 3G CDMA based handsets (IS2000 and UMTS) is because the latter uses continuous transmission. Their transmitter and/or receiver must be turned on for a high percentage of the time. Similar issues also appear in OFDM/OFDMA based standards, such as Wimax.

BRIEF DESCRIPTION OF THE DRAWINGS

Embodiments will now be described with reference to the attached drawings in which.

DETAILED DESCRIPTION OF EMBODIMENTS

Figure 1A:
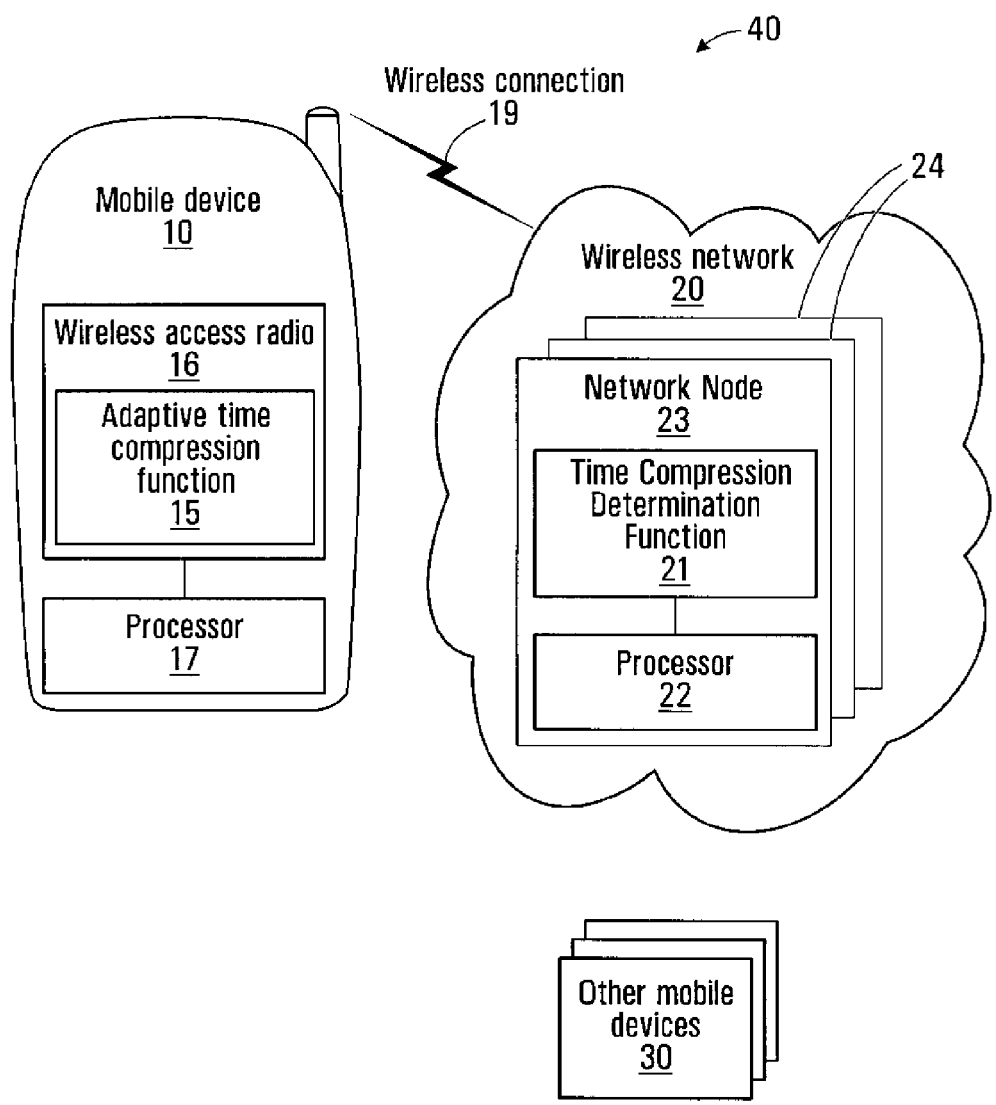
FIG. 1A is a block diagram of an example communication system.

According to an aspect of the application, there is provided a system and method for adaptive time compressed transmission over CDMA and OFDM/OFDMA based air interfaces to make use of the otherwise wasted air interface capacity and increase terminal battery life. Time compression or time compressed transmission relates to a technique that uses a shorter time for transmitting a block of data than the time used for generating the block of data by a source. The ratio of the time elapsed for (actively) transmitting the block of data to the time elapsed for generating the data from the source is referred to as a time compression ratio. The time compression ratio can be calculated by the ratio of source data rate to transmission data rate. Time compression can be suitable for low data rate applications (such as voice and low data rate real-time video) over high data rate air interface channels. Adaptive coding, incremental coding, modulation, multiple access, retransmission, power control and other media access control methods can be used to compress the time of transmission in either or both the reverse link (uplink) and the forward link (downlink). The mobile device might enter a low power consumption mode when the transmitter or receiver is not actively transmitting or receiving data. The real time application suffers no additional delay, the mobile device might achieve longer battery life, and good overall spectrum efficiency and network capacity is achieved when network load demands for it.

According to another broad aspect of the application, there is provided a method comprising: transmitting real-time data using adaptive time compression that is based on at least an estimation of network load.

In some implementations, the method further comprises: negotiating with a wireless network for the time compression ratio; wherein receiving the indication of the time compression ratio is in response to the negotiating.

In some implementations, transmitting the real-time data using adaptive time compression further comprises transmitting the real-time data in data frames.

In some implementations, the indication of the time compression ratio is received on an ongoing basis, the method further comprising: for each data frame, determining the time compression ratio based on the indication most recently received; wherein transmitting the real-time data in data frames comprises transmitting each data frame using the time compression ratio for the data frame.

In some implementations, the method further comprises: for each data frame that has been transmitted using the time compression ratio: determining whether the data frame is to be re-transmitted; and re-transmitting the data frame using the time compression ratio if it has been determined that the data frame is to be re-transmitted.

In some implementations, re-transmitting the data frame using the time compression ratio comprises at least one of: re-transmitting the data frame using the time compression ratio with power-control; and re-transmitting the data frame using the time compression ratio after a time gap accommodating for power control round trip delay.

In some implementations, the method further comprises: receiving feedback for a previous transmission; and determining a time compression ratio based on the feedback together with at least the estimation of network load; wherein transmitting the real-time data in data frames comprises transmitting the data frame using the time compression ratio for the data frame.

According to another broad aspect of the application, there is provided a computer readable medium having computer executable instructions stored thereon for execution on a processor so as to implement the method summarised above.

According to another broad aspect of the application, there is provided a mobile device comprising: a wireless access radio operable to transmit real-time data using adaptive time compression that is based on at least an estimation of network load.

According to another broad aspect of the application, there is provided a wireless network comprising: an adaptive time compression function operable to transmit real-time data using adaptive time compression that is based on at least an estimation of network load.

According to another broad aspect of the application, there is provided a method for execution in a wireless network, the method comprising: determining for a mobile device a time compression ratio based on at least one of: an estimation of network load, at least one media property of the real time data, and a battery level of the mobile device; transmitting to the mobile device an indication of the time compression ratio; and receiving real-time data transmitted using adaptive time compression; wherein receiving the real-time data comprises using the time compression ratio.

According to another broad aspect of the application, there is provided a computer readable medium having computer executable instructions stored thereon for execution on a processor so as to implement the method summarised above.

According to another broad aspect of the application, there is provided a wireless network comprising a time compression determination function operable to: determine for a mobile device a time compression ratio based on at least one of: an estimation of network load, at least one media property of the real-time data, and a battery level of the mobile device; transmit to the mobile device an indication of the time compression ratio; and receive real-time data transmitted using adaptive time compression; wherein receiving the real-time data comprises using the time compression ratio.

According to another broad aspect of the application, there is provided a method in a mobile device comprising: receiving real-time data that has been transmitted using adaptive time compression; determining a battery level of the mobile device; sending feedback comprising an indication of the battery level of the mobile device.

In some implementations, the method further comprises: determining an estimation of channel quality; wherein the feedback further comprises the estimation of channel quality.

In some implementations, the method further comprises: receiving an indication of a time compression ratio used in the adaptive time compression; wherein receiving the real-time data comprises using the time compression ratio.

According to another broad aspect of the application, there is provided a computer readable medium having computer executable instructions stored thereon for execution on a processor so as to implement the method summarised above.

According to another broad aspect of the application, there is provided a mobile device comprising: a wireless access radio operable to: receive real-time data that has been transmitted using adaptive time compression; determine a battery level of the mobile device; and send feedback comprising an indication of the battery level of the mobile device.

According to another broad aspect of the application, there is provided a method in a mobile device, the mobile device comprising a wireless access radio, the method comprising: receiving real-time data that has been transmitted using adaptive time compression, the real-time data being received in data bursts separated by time; and placing a portion of the mobile device in a low power mode while in-between the data bursts.

In some implementations, the method further comprises: the wireless access radio comprises circuitry; and placing a portion of the mobile device in the low power mode comprises turning off at least some of the circuitry of the wireless access radio.

According to another broad aspect of the application, there is provided a computer readable medium having computer executable instructions stored thereon for execution on a processor so as to implement the method summarised above.

According to another broad aspect of the application, there is provided a mobile device comprising: a wireless access radio operable to: receive real-time data that has been transmitted using adaptive time compression, the real-time data being received in data bursts separated by time; and place a portion of the mobile device in a low power mode while in between the data bursts.

Wireless Communication System

Referring now to FIG. 1A, shown is a block diagram of an example communication system 40. The communication system 40 has a wireless network 20, a mobile device 10, and other mobile devices 30; the communication system 40 may have other components, but they are not shown for sake of simplicity. The mobile device 10 has a wireless access radio 16 and a processor 17. The wireless access radio 16 has an adaptive time compression function 15. Alternatively, at least a portion of the adaptive time compression function 15 is implemented outside of the wireless access radio 16. The mobile device 10 may have other components, but they are not shown for sake of simplicity. The other mobile devices 30 may each have components similar to those of the mobile device 10. Alternatively, some or all of the other mobile devices 30 may have different components than those of the mobile device 10. The wireless network 20 has a network node 23 having a time compression determination function 21 and a processor 22. There may be other network nodes 24, each having a respective time compression determination function and a respective processor. The network nodes 23, 24 might for example be implemented each for a base station transceiver. The wireless network 20 may have other components, but they are not shown for sake of simplicity.

In operation, the mobile device 10 communicates with the wireless network 20 using its wireless access radio 16. The wireless communication is over a wireless connection 19 between the mobile device 10 and the wireless network 20. The other mobile devices 30 may similarly communicate with the wireless network 20 over respective wireless connections (not shown). The communication with the wireless network 20 might for example be real-time data such as voice and/or video telephony, or other forms of communication such as email.

If many of the mobile devices 10, 30 are actively communicating with the wireless network 20, then the network load might be at or near capacity. However, there may be situations when the network load might be quite low. In such instances, a sizable portion of the available capacity is not used. The capacity used for real-time data typically depends on the media properties of the data application. For example, real-time video typically uses more capacity than real-time voice.

According to an embodiment of the application, the time compression determination function 21 of the wireless network 20 operates to determine a time compression ratio based on an estimation of network load, one or more media properties of real-time data to be transmitted by the mobile device 10, and/or a battery level of the mobile device 10. The time compression ratio might be determined based on additional conditions, for example an estimation of channel quality. The time compression determination function 21 also operates to transmit an indication of the time compression ratio to the mobile device 10 so that it can use the time compression ratio for transmitting the real-time data.

The "indication" of the time compression ratio might include two or more variables from which the time compression ratio can be determined. Such variables might for example include any appropriate combination of an encoding configuration or an encoding rate, a symbol repetition factor, a puncturing/extending configuration or a puncturing/extending factor, a spreading configuration or a spreading factor, a modulation configuration or a level/constellation size of modulation, and a number of sub-carriers. The "indication" of the time compression ratio might also contain an index that points to a predetermined combination of the aforementioned parameter values. Alternatively, the "indication" of the time compression ratio might be a single identification of the time compression ratio. There are other possibilities for the "indication" of the time compression ratio.

The time compression determination function 21 might similarly determine and indicate a time compression ratio to each of the other mobile devices 30. The time compression ratio might be based on additional criteria, some of which might be device-specific. Therefore, the time compression ratio used for communications between the mobile device 10 and the wireless network 20 might be different from the time compression ratio used for communications between one of the other mobile devices 30 and the wireless network 20. The time compression ratio might be subject to change, for example if the estimation of network load changes. Further details of determining a time compression ratio are provided below with reference to FIG. 8.

The mobile device 10 receives the indication of the time compression ratio from the wireless network 20. According to another embodiment of the application, the adaptive time compression function 15 of the mobile device 10 operates to use the time compression ratio for adaptive time compression for transmissions. In this manner, the adaptive time compression function 15 of the mobile device 10 operates to transmit real-time data using adaptive time compression that is based on the estimation of network load, one or more media properties of the real-time data, and/or the battery level of the mobile device 10.

The time compression results in a reduced duty cycle, although the net throughput is constant because individual transmission bursts have greater throughput. However, the reduced duty cycle can result in improved battery life for the mobile device 10 due to the individual transmissions occupying less time. In some implementations, during the non-transmission periods, some circuitry of the wireless access radio 16 is turned off or placed in a low power consumption mode so as to consume less power. Further details of the low power mode are provided below with reference to FIGS. 1B and 10. Further details of time compression are provided below with reference to FIGS. 2 through 4.

In the illustrated example, the adaptive time compression function 15 of the mobile device 10 is implemented as software and is executed on the processor 17. However, more generally, adaptive time compression function 15 may be implemented as software, hardware, firmware, or any appropriate combination thereof.

In the illustrated example, the time compression determination function 21 of the wireless network 20 is implemented as software and is executed on the processor 22. However, more generally, the time compression determination function 21 may be implemented as software, hardware, firmware, or any appropriate combination thereof. Although shown as a single component, more generally, the time compression determination function 21 may have one or more components. The one or more components may be distributed throughout the wireless network 20 or located on a single network element. The one or more components may be integrated with other components of the wireless network 20. Other implementations are possible.

The wireless network 20 is shown without specific components. However, it is to be understood that the wireless network 20 would have any appropriate components suitable for a wireless network. Note that the wireless network 20 may include wires in spite of having components for wireless communication. The components of the wireless network are implementation specific and may depend on the type of wireless network. The wireless network 20 might utilize an air interface based on CDMA (code division multiple access) or DSSS (direct sequence spread spectrum), or another spread spectrum technology, OFDM (orthogonal frequency division multiplexing) or OFDMA (orthogonal frequency division multiple access) technology. Other air interfaces are possible.

In the illustrated example, transmitting real time data using adaptive time compression is performed by the mobile device 10. In another embodiment, the wireless network 20 transmits real-time data using adaptive time compression. In some embodiments, both the mobile device 10 and the wireless network 20 are capable of transmitting real-time data using adaptive time compression. More generally, one or more of the mobile devices 10, 30 and the wireless network 20 is capable of transmitting real-time data using adaptive time compression. An example in which a wireless network transmits real-time data using adaptive time compression is provided below with reference to FIG. 1B.

Figure 1B:
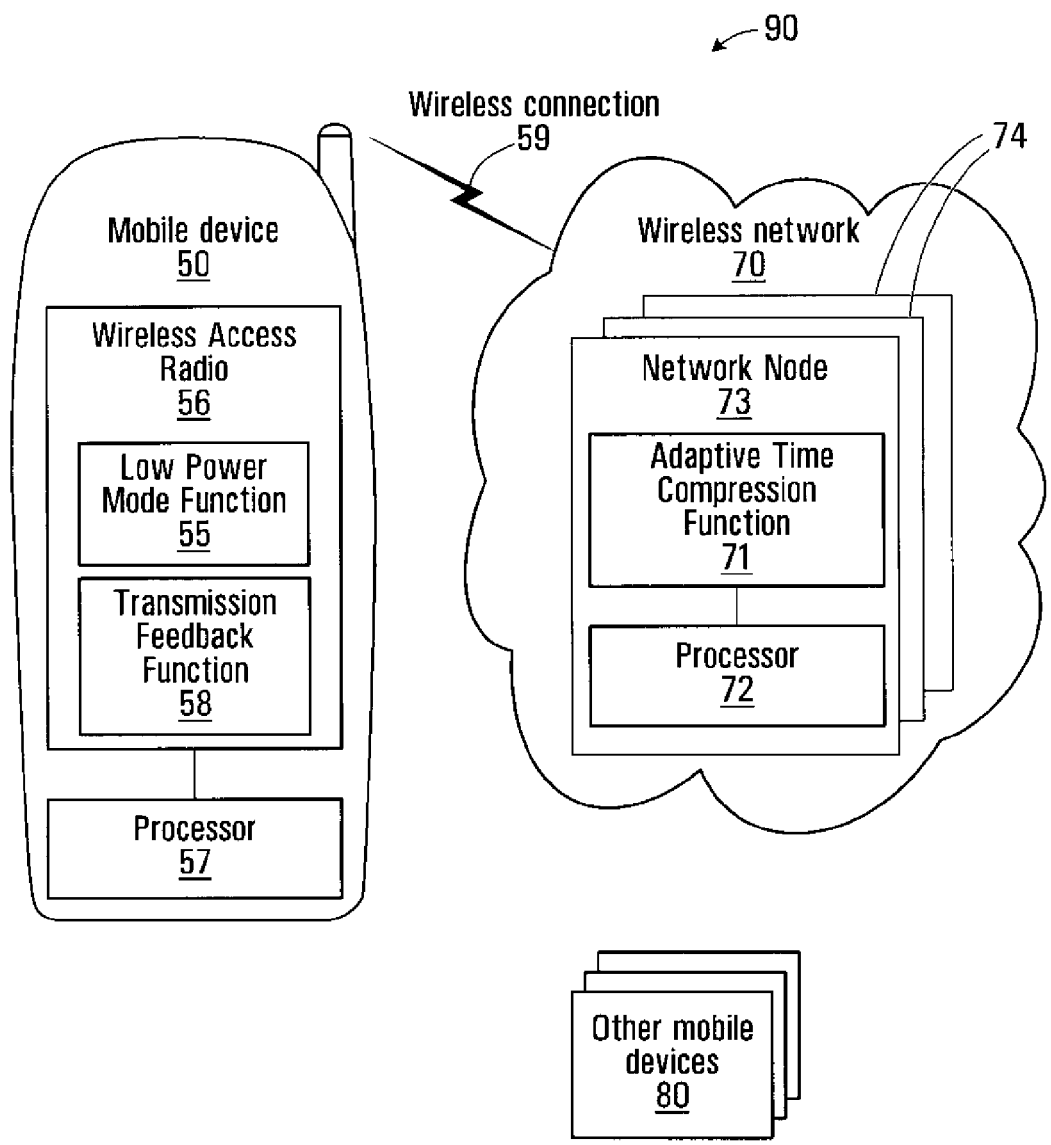
FIG. 1B is a block diagram of another example communication system.

Referring now to FIG. 1B, shown is a block diagram of another example communication system 90. The communication system 90 has a wireless network 70, a mobile device 50, and other mobile devices 80; the communication system 90 may have other components, but they are not shown for sake of simplicity. The mobile device 50 has a wireless access radio 56, which has a low power mode function 55 and a transmission feedback function 58. Alternatively, at least a portion of the low power mode function 55 and/or the transmission feedback function 58 is implemented outside of the wireless access radio 56. The mobile device 50 also has a processor 57. The mobile device 50 might have other components, but they are not shown for sake of simplicity. The other mobile devices 80 may each have components similar to those of the mobile device 50. Alternatively, some or all of the other mobile devices 80 may have different components than those of the mobile device 50. The wireless network 70 has a network node 73 having an adaptive time compression function 71 and a processor 72. There may be other network nodes 74, each having a respective time compression determination function and a respective processor. The network nodes 73, 74 might for example be implemented each for a base station transceiver. The wireless network 70 may have other components, but they are not shown for sake of simplicity.

In operation, the mobile device 50 communicates with the wireless network 70 over a wireless connection 59. The other mobile devices 80 may similarly communicate with the wireless network 70 over respective wireless connections (not shown). The communication with the wireless network 70 might for example be real-time data such as voice and/or video telephony, or other forms of communication such as email.

According to an embodiment of the application, the adaptive time compression function 71 of the wireless network 70 operates to transmit real-time data using adaptive time compression that is based on an estimation of network load, one or more media properties of the real time data, and/or the battery level of the mobile device 50. The adaptive time compression might be based on additional conditions, for example an estimation of channel quality. Further details of transmission by the wireless network are provided below with reference to FIGS. 5 through 7.

The mobile device receives the real-time data transmission from the wireless network 70. Since the real-time data was transmitted using adaptive time compression, the real-time data may be received in data bursts separated by time.

According to an embodiment of the application, the low power mode function 55 operates to place a portion of the mobile device 50 in a low power mode while in-between the data bursts. The portion of the mobile device 50 might for example include circuitry of the wireless access radio 56. It may also trigger other subsystems to be placed in low power mode as well, such as the processor 57. This can result in power savings for the mobile device 50. Further details of the low power mode are provided below with reference to FIG. 10.

The mobile device 50 is capable of determining an indication of its battery level. According to another embodiment of the application the transmission feedback function 58 operates to send feedback to the wireless network in response to receiving the real-time data such that the feedback is based on the indication of the battery level of the mobile device. The feedback may be based on other factors, for example an estimation of the down (forward) link channel quality. This allows the wireless network 70 to dynamically adjust the time compression ratio used for transmitting the real-time data based on the battery level of the mobile device 50, and possibly the channel quality that the mobile device sees. Further details of the feedback provided by the mobile device are provided below with reference to FIG. 10.

In the illustrated example, the mobile device 50 is shown with both the low power mode function 55 and the transmission feedback function 58. However, it is to be understood that the mobile device 50 need not have both of these components 55, 58. For instance, a mobile device might have one of the components 55, 58, but not the other. Furthermore, embodiments of the application are applicable for a scenario where a mobile device provides no feedback, and does not enter a low power mode. In this case, the mobile device might not have either of the components 55, 58.

In the illustrated example, the low power mode function 55 and the transmission feedback function 58 are both implemented as software and are executed on the processor 57. However, more generally, the low power mode function 55 and the transmission feedback function 58 may each be implemented as software, hardware, firmware, or any appropriate combination thereof.

In the illustrated example, the adaptive time compression function 71 of the wireless network 70 is implemented as software and is executed on the processor 72. However, more generally, the adaptive time compression function 71 may be implemented as software, hardware, firmware, or any appropriate combination thereof. Although shown as a single component, more generally, the adaptive time compression function 71 may have one or more components. The one or more components may be distributed throughout the wireless network 70 or located on a single network element. The one or more components may be integrated with other components of the wireless network 70. Other implementations are possible.

The wireless network 70 is shown without specific components. However, it is to be understood that the wireless network 70 would have any appropriate components suitable for a wireless network. Note that the wireless network 70 may include wires in spite of having components for wireless communication. The components of the wireless network are implementation specific and may depend on the type of wireless network. The wireless network 20 might utilize an air interface based on CDMA (code division multiple access) or DSSS (direct sequence spread spectrum), or another spread spectrum technology, OFDM (orthogonal frequency division multiplexing) or OFDMA (orthogonal frequency division multiple access) technology. Other air interfaces are possible.

Note that the adaptive time compression transmission examples presented herein specifically relate to wireless communication. However, it is to be understood that embodiments of the application are also applicable to wired communication.

Another Mobile Device

Figure 1C:
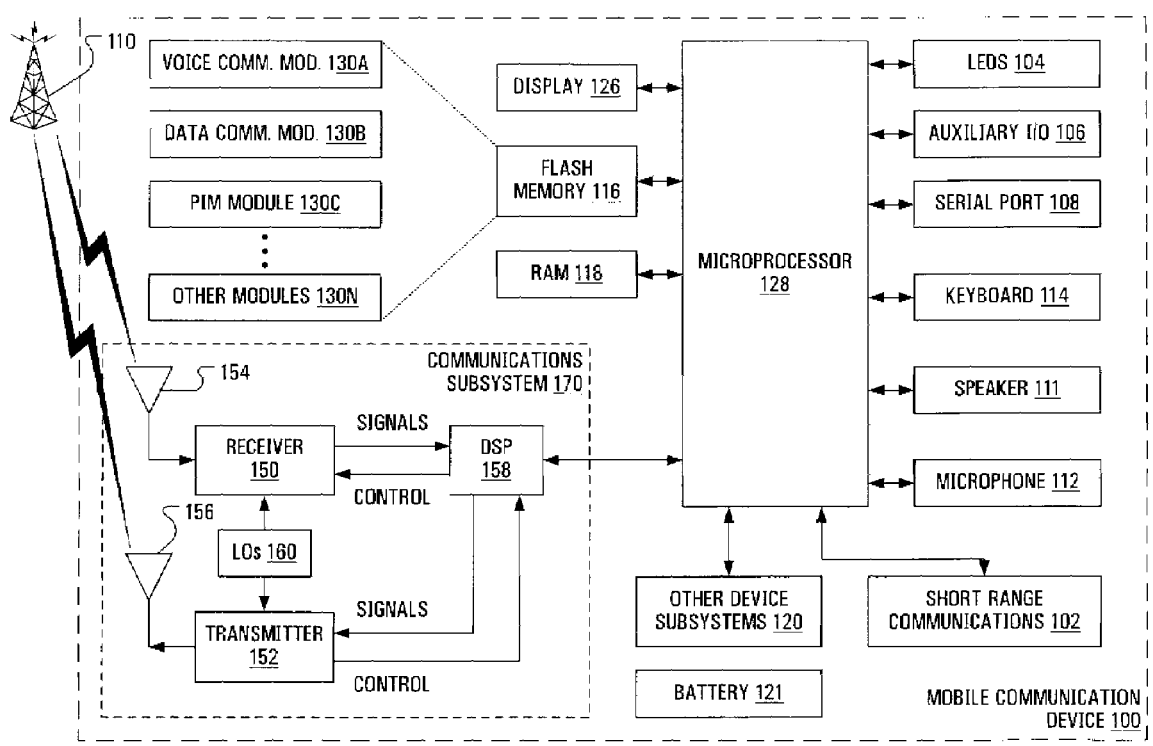
FIG. 1C is a block diagram of a mobile device.

Referring now to FIG. 1C, shown is a block diagram of another mobile device 100 that may implement any of the mobile device methods described herein. The mobile device 100 is shown with specific components for implementing features similar to those of the mobile device 10 of FIG. 1A. It is to be understood that the mobile device 100 is shown with very specific details for example purposes only.

A processing device (a microprocessor 128) is shown schematically as coupled between a keyboard 114 and a display 126. The microprocessor 128 is a type of processor with features similar to those of the processor 17 of the mobile device 10 shown in FIG. 1A. The microprocessor 128 controls operation of the display 126, as well as overall operation of the mobile device 100, in response to actuation of keys on the keyboard 114 by a user.

The mobile device 100 has a housing that may be elongated vertically, or may take on other sizes and shapes (including clamshell housing structures). The keyboard 114 may include a mode selection key, or other hardware or software for switching between text entry and telephony entry.

In addition to the microprocessor 128, other parts of the mobile device 100 are shown schematically. These include: a communications subsystem 170; a short-range communications subsystem 102; the keyboard 114 and the display 126, along with other input/output devices including a set of LEDS 104, a set of auxiliary I/O devices 106, a serial port 108, a speaker 111 and a microphone 112; as well as memory devices including a flash memory 116 and a Random Access Memory (RAM) 118; and various other device subsystems 120. The mobile device 100 may have a battery 121 to power the active elements of the mobile device 100. The mobile device 100 is in some embodiments a two way radio frequency (RF) communication device having voice and data communication capabilities. In addition, the mobile device 100 in some embodiments has the capability to communicate with other computer systems via the Internet.

Operating system software executed by the microprocessor 128 is in some embodiments stored in a persistent store, such as the flash memory 116, but may be stored in other types of memory devices, such as a read only memory (ROM) or similar storage element. In addition, system software, specific device applications, or parts thereof, may be temporarily loaded into a volatile store, such as the RAM 118. Communication signals received by the mobile device 100 may also be stored to the RAM 118.

The microprocessor 128, in addition to its operating system functions, enables execution of software applications on the mobile device 100. A predetermined set of software applications that control basic device operations, such as a voice communications module 130A and a data communications module 130B, may be installed on the mobile device 100 during manufacture. In addition, a personal information manager (PIM) application module 130C may also be installed on the mobile device 100 during manufacture. The PIM application is in some embodiments capable of organizing and managing data items, such as e-mail, calendar events, voice mails, appointments, and task items. The PIM application is also in some embodiments capable of sending and receiving data items via a wireless network 110. In some embodiments, the data items managed by the PIM application are seamlessly integrated, synchronized and updated via the wireless network 110 with the device user's corresponding data items stored or associated with a host computer system. As well, additional software modules, illustrated as another software module 130N, may be installed during manufacture.

Communication functions, including data and voice communications, are performed through the communication subsystem 170, and possibly through the short range communications subsystem 102. The communication subsystem 170 includes a receiver 150, a transmitter 152 and one or more antennas, illustrated as a receive antenna 154 and a transmit antenna 156. In addition, the communication subsystem 170 also includes a processing module, such as a digital signal processor (DSP) 158, and local oscillators (LOs) 160. The communication subsystem 170 having the transmitter 152 and the receiver 150 is an implementation of a wireless access radio with features similar to those of the wireless access radio 16 of the mobile device 10 shown in FIG. 1A. The specific design and implementation of the communication subsystem 170 is dependent upon the communication network in which the mobile device 100 is intended to operate. For example, the communication subsystem 170 of the mobile device 100 may be designed to operate with Code Division Multiple Access (CDMA) technology (such as 3GPP2 cdma2000™ and its evolution air interface, 3GPP UMTS and its evolution air interface), or Orthogonal Frequency Division Multiplex/Orthogonal Frequency Division Multiple Access (OFDM/OFDMA) technology, (such as WiMax air interface). Other types of data and voice networks, both separate and integrated, may also be utilized with the mobile device 100.

In some implementations, one of the other modules 130N is configured with software or firmware that when executed on the microprocessor 128, the mobile device 100 operates to transmit real-time data using adaptive time compression that is based on an estimation of network load, one or more media properties of the real-time data, and/or the battery level of the mobile device 100. The mobile device 100 might also operate to enter a low power consumption mode during an inactive period of transmission and/or reception. In some implementations, the communication subsystem 170 having the transmitter 152, the DSP 158, and the receiver 150 are adapted to implement the functionality. In other implementations, execution is performed by the DSP 158, or by both the DSP 158 and the microprocessor 128.

When network registration or activation procedures have been completed, the mobile device 100 may send and receive communication signals over the communication network 110. Signals received from the communication network 110 by the receive antenna 154 are routed to the receiver 150, which provides for signal amplification, frequency down conversion, filtering, channel selection, etc., and may also provide analog to digital conversion. Analog-to-digital conversion of the received signal allows the DSP 158 to perform more complex communication functions, such as demodulation and decoding. In a similar manner, signals to be transmitted to the network 110 are processed (e.g., modulated and encoded) by the DSP 158 and are then provided to the transmitter 152 for digital to analog conversion, frequency up conversion, filtering, amplification and transmission to the communication network 110 (or networks) via the transmit antenna 156.

In addition to processing communication signals, the DSP 158 provides for control of the receiver 150 and the transmitter 152. For example, gains applied to communication signals in the receiver 150 and the transmitter 152 may be adaptively controlled through automatic gain control algorithms implemented in the DSP 158.

In a data communication mode, a received signal, such as a text message or web page download, is processed by the communication subsystem 170 and is input to the microprocessor 128. The received signal is then further processed by the microprocessor 128 for an output to the display 126, or alternatively to some other auxiliary I/O devices 106. A device user may also compose data items, such as e-mail messages, using the keyboard 114 and/or some other auxiliary I/O device 106, such as a touchpad, a rocker switch, a thumb-wheel, or some other type of input device. The composed data items may then be transmitted over the communication network 110 via the communication subsystem 170.

In a voice communication mode, overall operation of the device is substantially similar to the data communication mode, except that received signals are output to a speaker 111, and signals for transmission are generated by a microphone 112. Alternative voice or audio I/O subsystems, such as a voice message recording subsystem, may also be implemented on the mobile device 100. In addition, the display 126 may also be utilized in voice communication mode, for example, to display the identity of a calling party, the duration of a voice call, or other voice call related information.

The short-range communications subsystem 102 enables communication between the mobile device 100 and other proximate systems or devices, which need not necessarily be similar devices. For example, the short-range communications subsystem may include an infrared device and associated circuits and components, or a Bluetooth™ communication module to provide for communication with similarly-enabled systems and devices.

Transmission by Mobile Device

Figure 2:
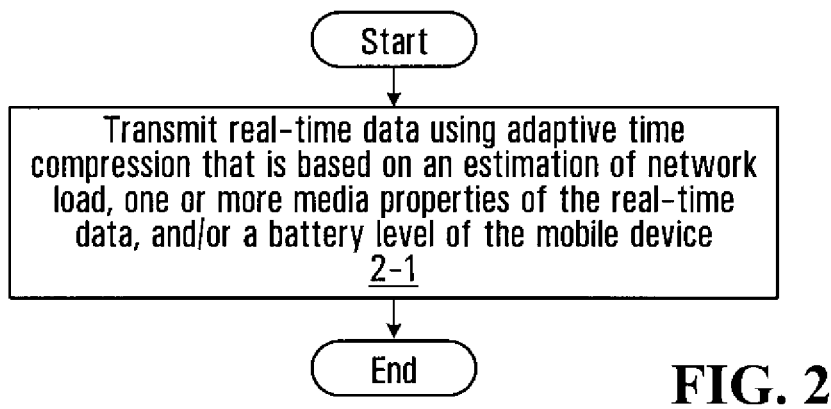
FIGS. 2 through 4 are flowcharts of methods of transmitting real-time data using adaptive time compression.
Figure 3:
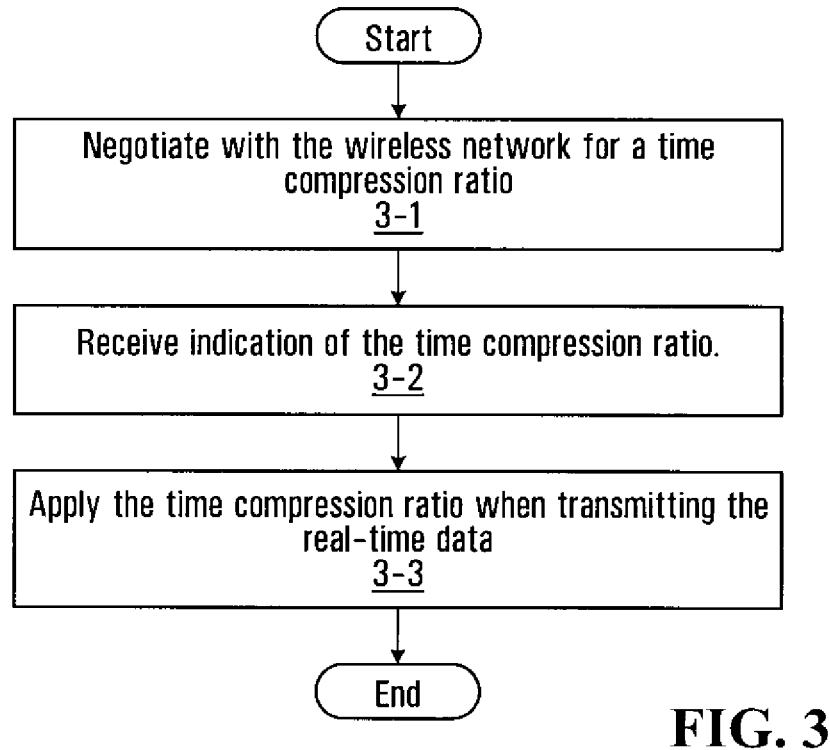
Figure 4:
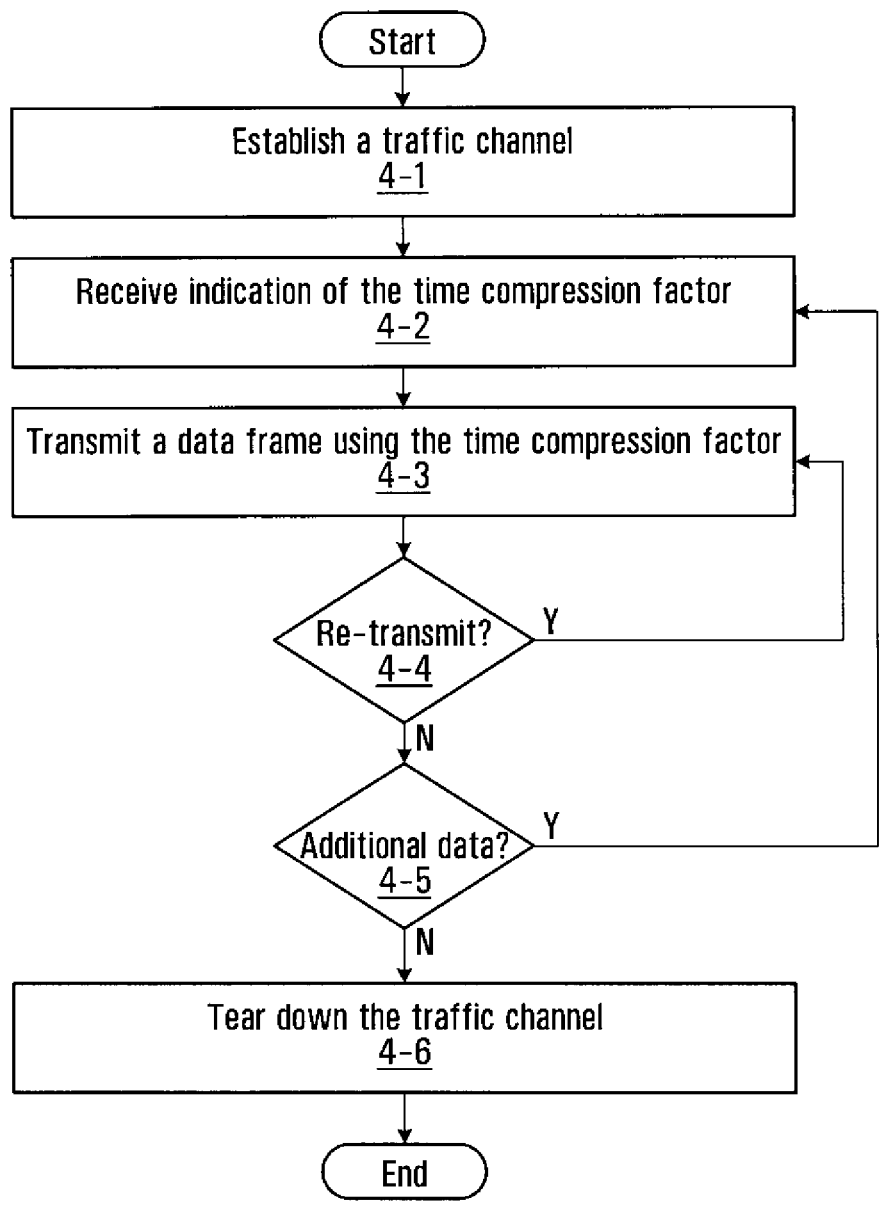

Referring now to FIGS. 2 through 4, shown are flowcharts of methods of transmitting real-time data using adaptive time compression. These methods may each be implemented in a mobile device, for example by the adaptive time compression function 15 of the mobile device 10 shown in FIG. 1A. Alternatively, these methods may be implemented in the mobile device 100 shown in FIG. 1C. More generally, these methods may be implemented in any appropriate communications device. These methods may be implemented separately, or in any appropriate combination.

Referring first to FIG. 2, at step 2-1 the mobile device transmits real-time data using adaptive time compression that is based on an estimation of network load, one or more media properties of the real-time data, and/or a battery level of the mobile device. The adaptive time compression might be based on additional conditions, for example an estimation of channel quality. In some implementations, the real-time data is transmitted over a CDMA-based or DSSS-based air interface. In other implementations, the real-time data is transmitted over an OFDM/OFDMA air interface. Other air interfaces are possible.

There are many ways for the mobile device to transmit real-time data using adaptive time compression that is based on the estimation of network load, at least one media property of the real-time data, and/or the battery level of the mobile device. Examples are provided below with reference to FIGS. 3 and 4. However, it is to be understood that there are other possibilities than those shown.

Referring now to FIG. 3, at step 3-1 the mobile device negotiates with the wireless network for a time compression ratio. The wireless network determines a time compression ratio based on the negotiation. The mobile device might negotiate for the time compression ratio based on one or more media properties of real-time data to be transmitted, and/or the battery level of the mobile device. This might for example involve the mobile device communicating to the wireless network the media properties of real-time data to be transmitted, and/or the battery level of the mobile device. The wireless network determines a time compression ratio based on the negotiation. The wireless network might also determine the time compression ratio based on additional conditions, for example an estimation of network load and/or an estimation of channel quality. The wireless network transmits an indication of the time compression ratio to the mobile device. At step 3-2, the mobile device receives the indication of the time compression ratio. At step 3-3, the mobile device applies the time compression ratio when transmitting the real-time data. In this manner, the mobile device operates to transmit the real-time data using adaptive time compression that is based on the estimation of network load, one or more media properties of the real-time data to be transmitted, and/or the battery level of the mobile device. The adaptive time compression might be based on additional conditions, for example an estimation of channel quality. Note that some or all of the steps described above may be executed on an ongoing basis so that the time compression ratio is updated dynamically. The time compression ratio might for example change if the estimation of network load changes.

In some implementations, the time compression ratio is varied through coding and modulation configurations. In a CDMA or an OFDM/OFDMA based system, a higher effective transmission rate than the source data rate of a low rate real-time application can usually be achieved. Therefore, the same source data throughput can be achieved over a shorter transmission time. In a CDMA based system, the higher effective transmission rate can be implemented through the use of a smaller overall spreading factor. A variable overall spreading factor can be implemented by a combination use of variations in, for example (but not limited to), encoding rate, symbol repetition factor, puncturing/extending factor, spreading factor, level or constellation size of modulation, number of sub-carriers (where applicable). Similarly, in an OFDM/OFDMA based system, the effective transmission rate can be varied through, for example, number of sub-carriers, encoding rate, symbol repetition factor, puncturing/extending factor, level or constellation size of modulation. In some implementations, the time compression ratio is dependent on and can be controlled by the assigned combinations of these parameters.

In some implementations, the time compression ratio is based on the estimation of network load. An estimation of network load may also be referred to as an estimation of the unused channel capacity, available channel capacity, usable channel capacity, capacity margin, capacity headroom, throughput, unused throughput, available throughput, throughput headroom, noise rise, and so on, or a ratio thereof to the corresponding total value.

In some implementations, the time compression ratio is based on the media properties of the real-time data. The media properties may include the data rate(s), latency tolerance, packet/frame size, total duration of use (or an estimate thereof), grade of service, and billing class. In some implementations, when the time compression ratio is based on the media properties of the real-time data, the mobile device may first transmit an indication of the media properties of the real-time data to the wireless network. This allows the wireless network to become aware of the media properties of the real-time data so that the time compression ratio can be determined.

In some implementations, the time compression ratio is based on the remaining battery capacity on the wireless device, which sometimes are referred to or reflected by a battery level, a battery charge level, a remaining talk time, a battery voltage, etc., or a ratio/percentage thereof to the corresponding total/nominal value. In some implementations, when the time compression ratio is based on the remaining battery capacity, the mobile device may first transmit an indication of the remaining battery capacity to the wireless network. This allows the wireless network to become aware of the remaining battery capacity so that the time compression ratio can be determined.

In some implementations, the time compression ratio is based on additional conditions, for example an estimation of channel quality. There are many possibilities for the estimation of channel quality. The estimation of channel quality might for example include one or more channel quality parameters. In some implementations, the wireless network determines the one or more channel quality parameters. The one or more channel quality parameters might for example include one or more of a received signal to noise ratio, a received signal to interference ratio, a multipath propagation delay profile, a Doppler spread and/or a Doppler shift, a channel frequency response, measures for burst interferences such as strength, duration, frequency and bandwidth, channel nonlinearity, and speed of varying of the channel parameters. Other channel quality parameters are possible.

In some implementations, real-time data is transmitted using frames or bursts. An example implementation of transmitting real-time data using frames is provided below with reference to FIG. 4. It is to be understood that this implementation is very specific for example purposes only. Similar implementations are possible for bursts.

Referring now to FIG. 4, at step 4-1 the mobile device establishes a traffic channel, details of which are provided below. The mobile device might also indicate to the wireless network the media properties of the application and might also indicate its battery level. The wireless network determines a time compression ratio based on an estimation of network load, the media properties of the real-time data application and/or the battery level of the mobile device. The wireless network might determine the time compression ratio based on additional factors, for example an estimation of channel quality (e.g., as feedback from the mobile device). Other examples are provided later. The network transmits an indication of the time compression ratio to the mobile device. At step 4-2, the mobile device receives the indication of the time compression ratio. At step 4-3, the mobile device transmits a data frame using the time compression ratio. In some implementations, the data frame is transmitted together with a preamble.

There are many ways for the mobile device to establish a traffic channel. Establishing a traffic channel might for example involve various communication with one or more serving base stations. The mobile device might receive a paging and acknowledge the paging using an access channel or a common control channel or the like. Alternatively, the mobile device might autonomously transmit an access probe using an access channel or a common control channel or the like. The mobile device receives an acknowledgement from the paging channel or the like, and transmits a traffic channel preamble. The mobile device might also receive a traffic channel preamble transmitted from the serving base station(s).

In some implementations, if the wireless network successfully receives the data frame, then the wireless network transmits an acknowledgement to the mobile device. In some implementations, if the wireless network is not successful in receiving the data frame, then the wireless network transmits a negative acknowledgement to the mobile device. More generally, the wireless network may transmit a message from which it can be determined whether to re-transmit the data frame or its additional check bits of forward error correction codes.

At step 4-4, the mobile device determines whether the data frame is to be re-transmitted for example based on whether there is a received message from which it can be determined whether to re-transmit the data frame. In some implementations, the mobile device determines whether it should perform an Automatic Repeat reQuest (ARQ) retransmit, which involves re-transmitting the data frame. In some implementations, the mobile device determines whether it should perform a Hybrid Automatic Repeat reQuest (HARQ) retransmit, which involves re-transmitting check bits or transmitting additional check bits with or without retransmitting the frame data. If the data frame or check bits is to be re-transmitted or transmitted, then processing continues at step 4-3 in which the frame and/or check bits are (re-)transmitted. In some implementations, transmitting and/or re-transmitting the data frame and/or check bits are power-controlled, details of which are provided below with reference to FIG. 10. In some implementations, re-transmitting the data frame and/or check bits occurs after a time gap, details of which are provided below with reference to FIG. 11.

If the data frame is not to be re-transmitted, then at step 4-5 the mobile device determines whether there is additional real-time data to be transmitted. If there is additional real-time data to be transmitted, then processing continues at step 4-2 for the next data frame. However, if there is no additional real-time data to be transmitted, then processing ends. In some implementations, as indicated at step 4-6, the traffic channel is brought down.

Transmission by Wireless Network

Figure 5:
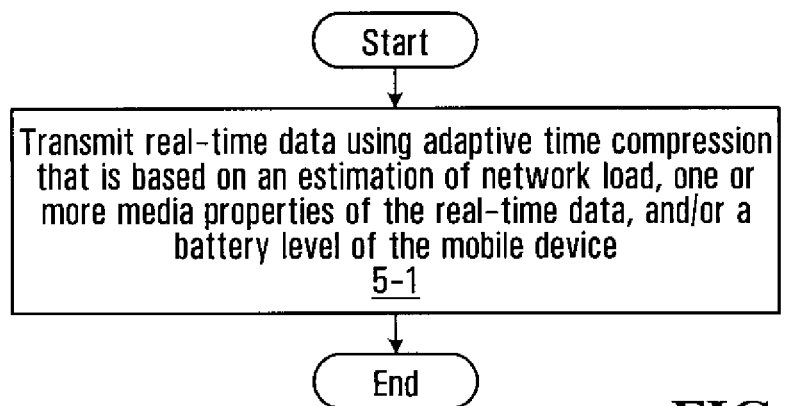
FIGS. 5 through 7 are flowcharts of methods of transmitting real-time data using adaptive time compression.
Figure 6:
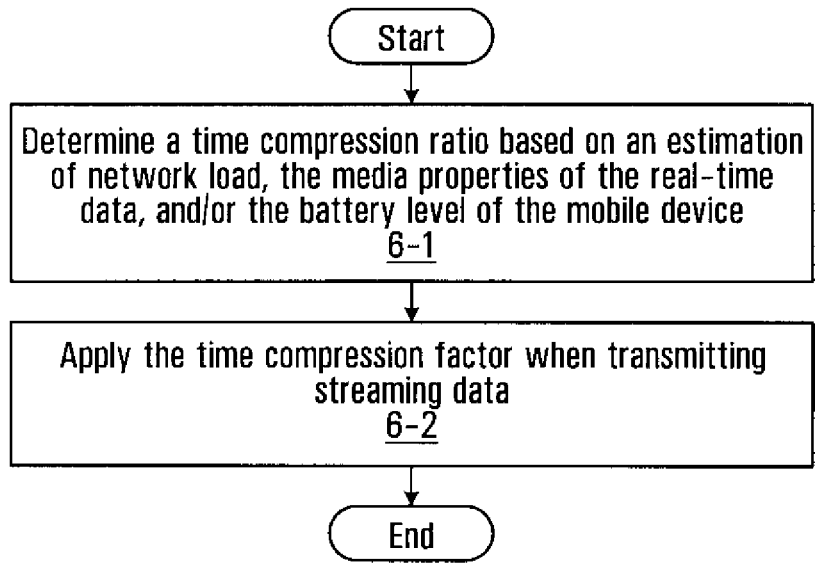
Figure 7:
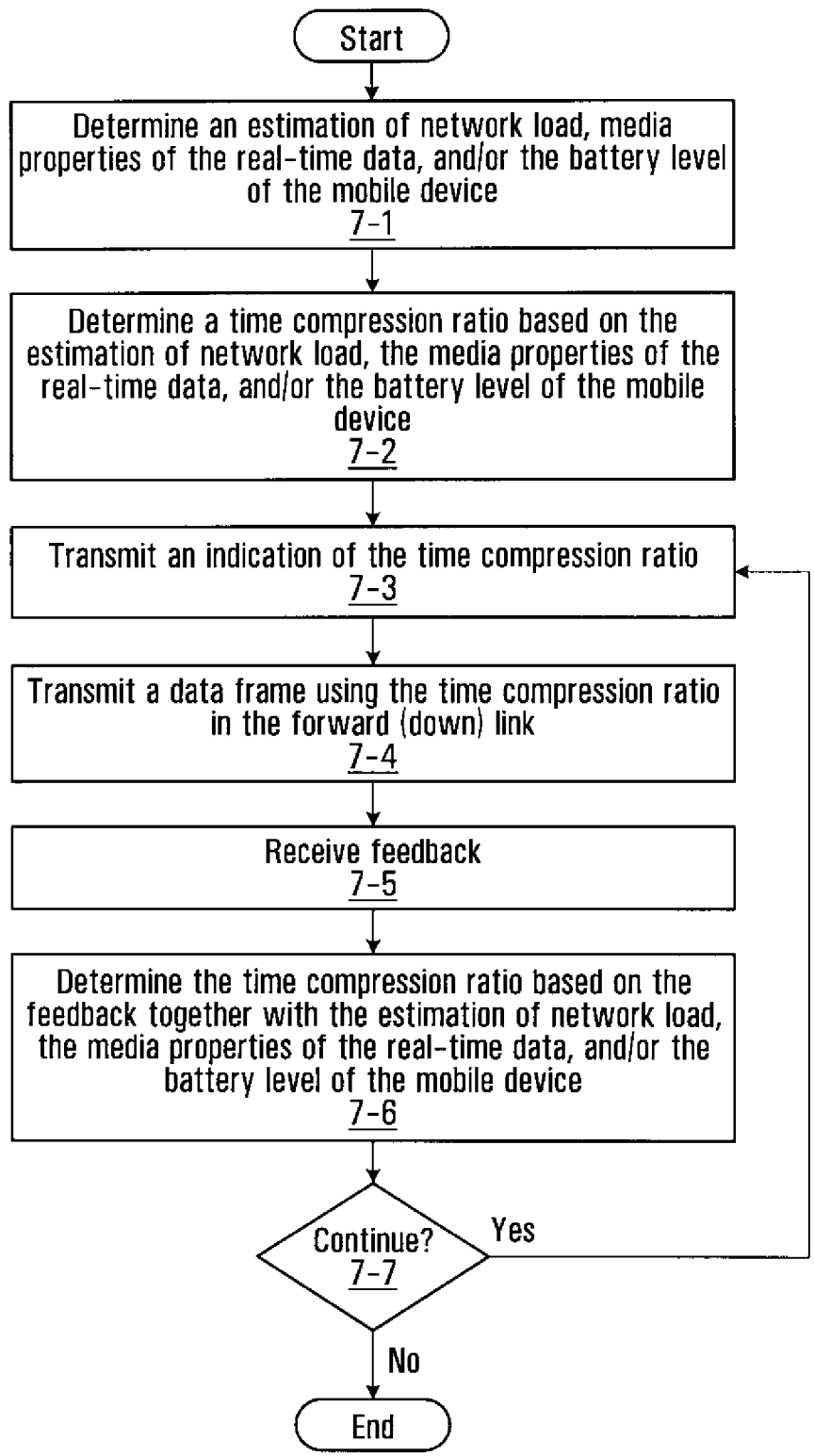

Referring now to FIGS. 5 through 7, shown are flowcharts of methods of transmitting real-time data using adaptive time compression. These methods may each be implemented in a wireless network, for example by the adaptive time compression function 71 of the wireless network 70 shown in FIG. 1B. These methods may be implemented separately, or in any appropriate combination.

Referring first to FIG. 5, at step 5-1 the wireless network transmits to a mobile device real-time data in the forward (down) link using adaptive time compression that is based on an estimation of network load, the media properties of the real-time data, and/or the battery level of the mobile device. The adaptive time compression might be based on additional conditions, for example an estimation of channel quality. In some implementations, the real-time data is transmitted over a CDMA-based air interface, for example, 3GPP2 CDMA, 3GPP W-CDMA, or 801.11b WLAN, and so on, or their evolutions. In other implementations, the real-time data is transmitted over an OFDM/OFDMA air interface. Other air interfaces are possible. There are many ways for the wireless network to transmit real-time data using adaptive time compression that is based on the estimation of network load, the media properties of the real-time data, and/or the battery level of the mobile device. Examples are provided below with reference to FIGS. 6 and 7. However, it is to be understood that there are other possibilities than those shown.

Referring now to FIG. 6, at step 6-1, the wireless network determines a time compression ratio based on an estimation of network load, the media properties of the real-time data, and/or the battery level of the mobile device. The wireless network might determine the time compression ratio based on additional conditions, for example an estimation of channel quality. At step 6-2, the wireless network applies the time compression ratio when transmitting real time data in the forward (down) link.

In some implementations, the time compression ratio is based on the estimation of network load. There are many ways for the wireless network to determine the estimation of network load. In some implementations, the wireless network determines the estimation of network load based on one or more of forward-link (down link) load and reverse-link (up link) load. Other implementations are possible. The estimation of network load may also be referred to using different terminology, examples of which have been provided above.

In some implementations, the time compression ratio is based on the media type of the real-time data. The media types might for example include voice only, video only, and voice together with video. In some implementations, the wireless network determines the media type of the real-time data as being any one of voice only, video only, and voice together with video. In some implementations, the time compression ratio is determined differently for each media type. Other implementations are possible.

In some implementations, the time compression ratio is based on the media properties of the real-time data. Other criteria are possible for determining the time compression ratio. The media properties may include the data rate(s), latency tolerance, packet/frame size, total duration of use (or an estimate thereof), grade of service, and billing class. Channel quality at a given link (uplink or down-link) at a given base station might also be considered when determining the time compression ratio.

In other implementations, the time compression ratio is based on the remaining battery capacity on the wireless device. The battery level information may be reported by a mobile device to the wireless network through messages. The battery level may also be referred to using different terminology, examples of which have been provided above.

In some implementations, real-time data is transmitted using frames. An example implementation is provided below with reference to FIG. 7. It is to be understood that this implementation is very specific for example purposes only.

Referring now to FIG. 7, at step 7-1 the wireless network determines an estimation of network load, media properties of the real-time data, and/or the battery level of the mobile device. The determining may involve receiving messages from the mobile device to obtain some of the estimates performed at mobile device, for example the battery level of the mobile device. The network might determine additional particular, for example an estimation of channel quality. At step 7-2, the wireless network determines a time compression ratio based on the estimation of network load, the media properties of the real-time data, and/or the battery level of the mobile device. In some implementations, as indicated at step 7-3, the network transmits an indication of the time compression ratio to be used for the transmission. This allows the mobile device to decode the transmission without performing blind detection of compression ratio. The indication of the time compression ratio may be indicative of the time compression ratio for the current frame, or to the next frame. Example possibilities for the indication of the time compression ratio have been provided above. At step 7-4, the wireless network transmits a data frame using the time compression ratio in the forward (down) link. The mobile device receives the data frame and provides the wireless network with feedback. At step 7-5, the wireless network receives the feedback. At step 7-6, the wireless network determines the time compression ratio based on the feedback together with the estimation of network load, the media properties of the real-time data, and/or the battery level of the mobile device. The wireless network might determine the time compression ratio based on additional conditions, for example an estimation of channel quality that might be provided by the feedback. If at step 7-7 the transmission is to continue, then processing continues starting at step 7-3. If at step 7-7 the transmission is completed, then processing finishes.

Time Compression Ratio Determination

With reference to FIGS. 3 and 4, the wireless network determines a time compression ratio and transmits an indication of the time compression ratio to the mobile device. An example implementation of this is provided below with reference to FIG. 8.

Figure 8:
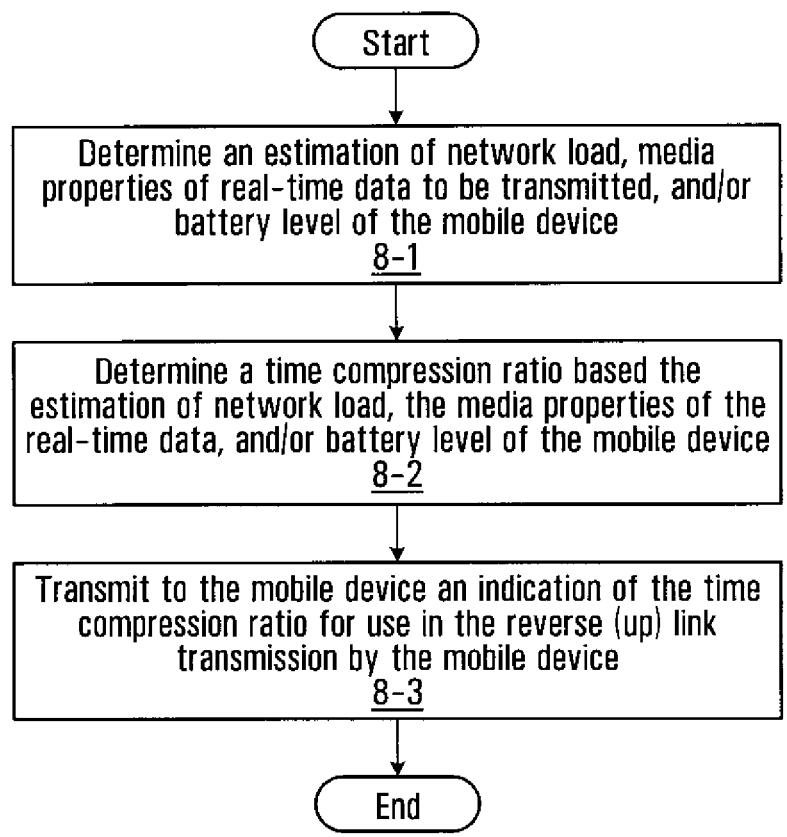
FIG. 8 is a flowchart of a method of determining a time compression ratio and transmitting an indication of the time compression ratio to a mobile device.

Referring now to FIG. 8, shown is a method of determining a time compression ratio and transmitting an indication of the time compression ratio to a mobile device. This method may be implemented in a wireless network, for example by the time compression determination function 21 of the wireless network 20 shown in FIG. 1A. This method may be implemented separately, or in any appropriate combination with the methods described with reference to FIGS. 6 and 7.

At step 8-1 the wireless network determines an estimation of network load, media properties of real-time data to be transmitted, and/or battery level of the mobile device, examples of which have been provided above. The wireless network might determine additional conditions, for example an estimation of channel quality. The channel quality may be obtained for example from feedback from the mobile device. At step 8-2, the wireless network determines a time compression ratio based the estimation of network load, the media properties of the real-time data, and/or battery level of the mobile device. Examples of how this might be implemented have been provided above. The wireless network might determine the time compression ratio based on the additional conditions. At step 8-3, the wireless network transmits to the mobile device an indication of the time compression ratio. In the scenario where the mobile device is to transmit real-time data using adaptive time compression, then the mobile device might use the time compression ratio for transmitting the real-time data. In the scenario where the mobile device is to receive real-time data transmitted from the wireless network using adaptive time compression, then mobile device might use the time compression ratio for receiving the real-time data so that blind detection is not needed.

Feedback from Mobile Device

In some embodiments, the mobile device provides feedback to the wireless network. The feedback might be used by the wireless network in determining or adjusting the time compression ratio. Examples have been provided where the mobile device provides feedback when the mobile device transmits real-time data using adaptive time compression. The feedback might include an indication of the battery level of the mobile device and/or the media properties of the real-time data. Examples have also been provided where the mobile device provides feedback when the wireless network transmits real-time data using adaptive time compression. The feedback might include an indication of the battery level of the mobile device. The feedback might also include an estimation of channel quality. An example where the mobile device provides feedback when the wireless network transmits real-time data using adaptive time compression is provided below with reference to FIG. 9.

Figure 9:
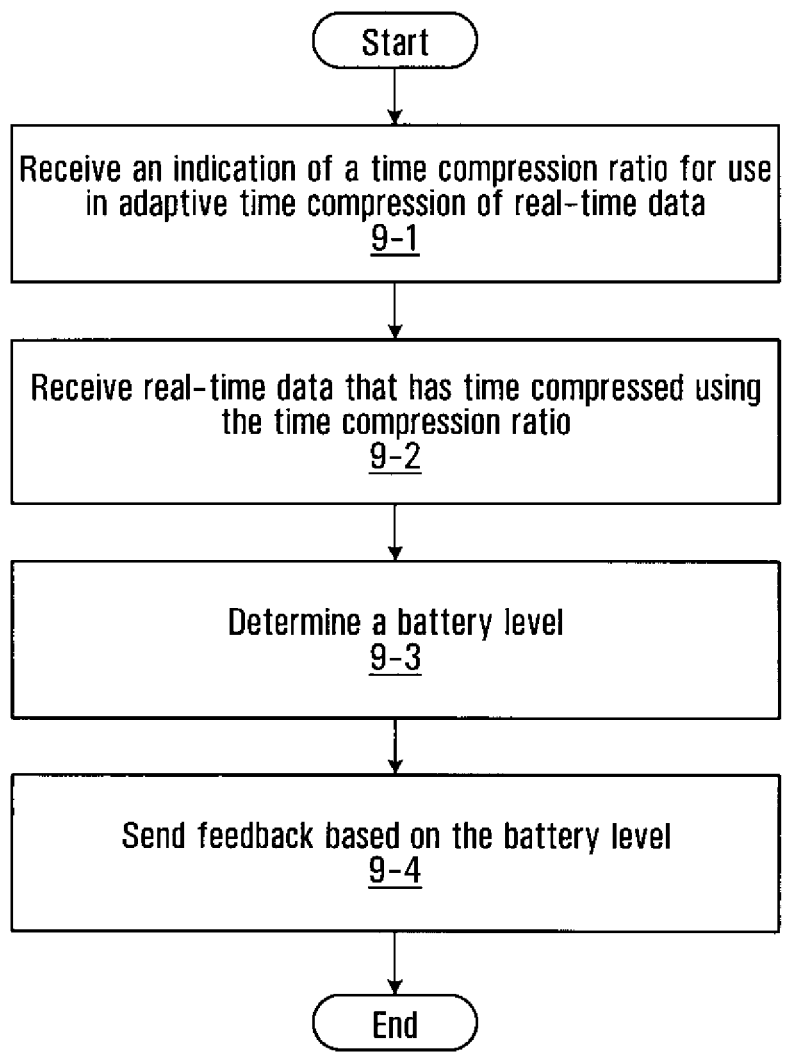
FIG. 9 is a flowchart of a method of providing feedback to real-time data transmission.

Referring now to FIG. 9, shown is a flowchart of a method of providing feedback to real-time data transmission. This method can be implemented in a mobile device, for example by the transmission feedback function 58 of the mobile device 50 shown in FIG. 1B. Alternatively, this method can be implemented in any appropriate mobile device.

In some implementations, as indicated at step 9-1, the mobile device receives an indication of a time compression ratio for use in adaptive time compression of real-time data. At step 9-2, the mobile device receives real-time data that was time compressed using the time compression ratio. The mobile device uses the indication of the time compression ratio for receiving the real-time data. Alternatively, if the time compression ratio is not provided, the mobile device might perform blind detection. At step 9-3, the mobile device determines its battery level. Example indications for the battery level have been provided above and are therefore not repeated here. At step 9-4, the mobile sends feedback such that the feedback is based on the battery level. This allows the wireless network to dynamically adjust the time compression ratio used for transmitting the real-time data based on the battery level of the mobile device. In some implementations, the feedback is also based on an estimation of channel quality. In some implementations, feedback including an estimation of channel quality is provided more frequently than feedback the battery level. The estimation of channel quality is likely to change more frequently than the battery level. Feedback including an estimation of channel quality might for example be provided every burst/frame. Other implementations are possible.

Low Power Mode of Mobile Device

In some embodiments, there is provided a low power mode for the mobile device. Examples have been presented above where a mobile device transmitting real-time data using adaptive time compression might place a portion of the mobile device in a low power mode while in-between the data bursts. Examples have also been provided where a mobile device receiving real-time data using adaptive time compression might place a portion of the mobile device in a low power mode while in between the data bursts. More generally, a mobile device might place a portion of the mobile device in a low power mode while in-between the data bursts of a transmission and/or reception. An example where a mobile device receiving real-time data using adaptive time compression enters a low-power mode in-between the data bursts is provided below with reference to FIG. 10.

Figure 10:
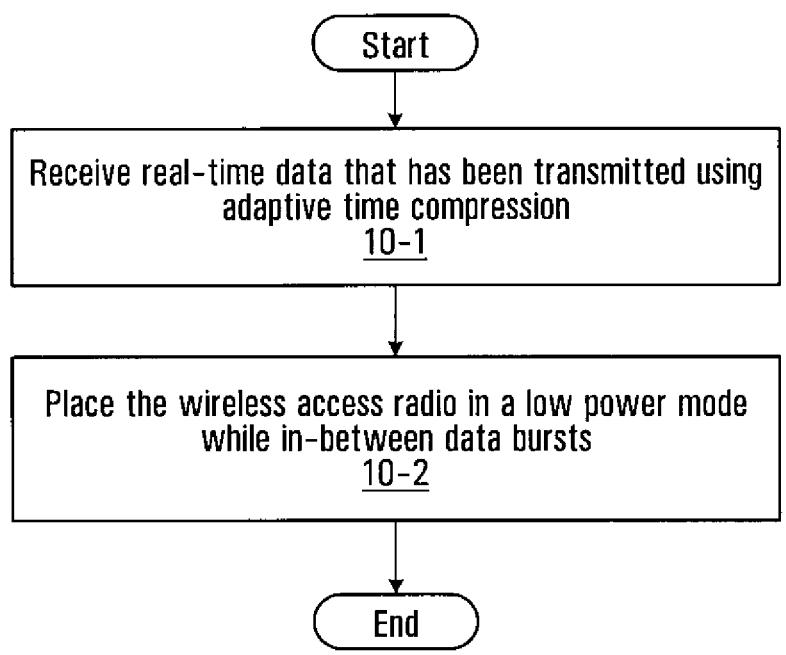
FIG. 10 is a flowchart of a method of placing a wireless access radio in a low-power mode.

Referring now to FIG. 10, shown is a flowchart of a method of placing a wireless access radio in a low-power mode. This method can be implemented in a mobile device, for example by the low power mode function 55 of the mobile device 50 shown in FIG. 1B. Alternatively, this method can be implemented in any appropriate mobile device.

At step 10-1, the mobile device receives real-time data that has been transmitted using adaptive time compression. The data is received in data bursts separated by time. At step 10-2, the mobile device places a portion of the mobile device in a low power mode while in-between the data bursts. This can result in power savings for the mobile device. In some implementations, placing the wireless access radio in the low power mode involves turning off at least some circuitry of the wireless access radio. In some implementations, placing a portion of the mobile device in the low power mode involves configuring the processor into a low clock rate operation. More generally, at least a part of at least one subsystem is placed into a low power mode. Other implementations are possible.

The Example presented above with reference to FIG. 10 relates to placing the wireless access radio in a low power mode while in-between the data bursts. This example describes the scenario where the mobile device is receiving the real-time data. However, it is to be understood that placing the wireless access radio in a low power mode while in-between the data bursts is also applicable for the scenario where the mobile device is transmitting the real-time data.

Transmission

Specific Examples

Specific examples are presented in this section. It is to be understood that these examples include very specific details for example purposes only.

In the following description, the variable rate voice encoding used in cdma2000 is used as an example—it uses 9.6 kbps full rate and 1.2 kbps ⅛th rate, and 4.8 kbps half rate. However, embodiments of the application are not limited to such voice coding. The method is very suitable for use in IP based voice and video applications over wireless network. Furthermore, the method can also be applied to any CDMA based or OFDM/OFDMA based transmission (e.g. evolutions of UMTS, Wimax, etc.).

In the following description, 1.25 ms length of power control group and 20 ms length of voice frame in cdma2000 are also used as examples. However, embodiments of the application are not limited to these example numbers.

Through the use of a smaller spreading factor in CDMA based system, or through the use of more sub-carriers in OFDM/OFDMA based system, the source data rate can be achieved using a higher effective transmission rate over a shorter transmission time. The time compression ratio is dependent on and can be controlled by the assigned value of spreading factor for a CDMA based system and on the assigned number of sub-carriers for an OFDM/OFDMA based system. According to an aspect, the method is to adaptively control the time compression ratio based on the following aspects:

1. channel quality at a given radio link, frequency and time;
2. the network load level at a given link (up or down link) at a given base station serving area and time; and
3. the transmission media type and source data rate, or more generally media properties.

Specific examples are provided below.

First Specific Example

Figure 11:
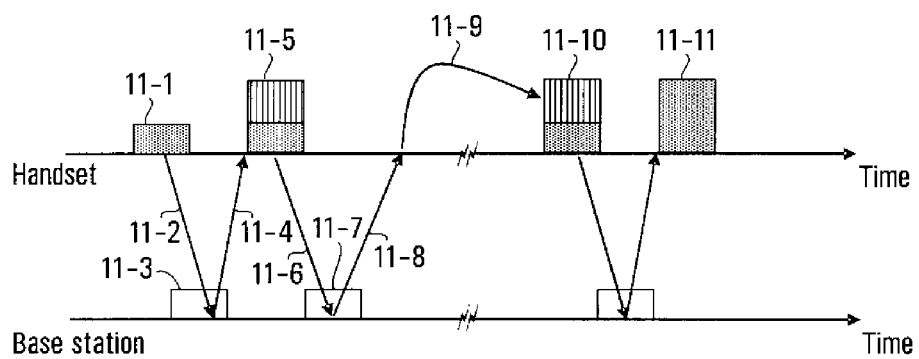
FIGS. 11 through 13 are signalling diagrams for specific examples.

Referring now to FIG. 11 shown is a signaling diagram for a first specific example. Unlike in conventional cdma2000 transmission, voice frames that are transmitted every 20 ms do not always take 20 ms to transmit, but may be transmitted at a higher data rate that takes shorter time. However, similar to conventional CDMA transmission, each frame that is produced at 20 ms intervals is delivered within 20 ms.

Suppose the CDMA transmitter receives the first voice frame for transmission, the transmitter then is turned on at the scheduled time slot and transmits a pilot signal 11-1 with a duration of one power control group (1.25 ms), upon finishing the pilot transmission 11-1, the transmitter is turned off. The pilot is propagated 11-2 over the air to a base station. The base station receives the pilot and based on the received pilot signal quality and reverse link base station load, determines 11-3 the power control bits as well as the time compression ratio control bits. The power control bits and time compression ratio control bits are propagated 11-4 over the air and arrive at handsets 11-5. Based on the instruction of the received power control bits and time compression ratio control bits, the handset 11-5 determines the next transmit power and the coding-modulation parameters to transmit the first voice frame together with a pilot. In encoding and modulating the voice frame, a higher data rate than source data rate may be used, such as 16 times of the voice frame data rate, according to the time compression ratio control bits received. If the voice frame is 9.6 kbps full rate, for example, the transmissions rate may be 153.6 kbps, and therefore it can be transmitted within 20 ms/16=1.25 ms. Similarly, the transmission rate for a half rate voice frame at 16 times of rate ratio will be 76.8 kbps, and ⅛th rate frame at 19.2 kbps. Half and ⅛th rate data frames may also be allowed to have a different time compression ratio from that of full rate, according to the time compression ratio control bits, for example, half rate may use time compression ratio of 32 and ⅛th rate may use time compression ratio of 128, so that the transmission data rate is 153.6 kbps.

The transmitted first frame propagates 11-6 over the air to the base station, and is received and decoded 117 at base station 7. If the CRC check passed, a positive acknowledgement is sent 11-8 back to handset. Otherwise, a negative acknowledgement is sent 11-8 back to handset. Upon reception of the acknowledgement, the handset determines 11-9 whether it needs to re-transmit the first voice frame or not. At the next scheduled pilot transmission slot, if the first voice frame needs to be re-transmitted as has been determined, the pilot is transmitted 11-10 together with the re-transmitted frame (to be further detailed below). If re-transmission is not needed, the handset transmits another pilot like at 11-2 for preparing transmission of a next voice frame. Between steps 11-1 and 11-10, the time interval is 20 ms if using predetermined time interval, or on average 20 ms if slot transmission time is randomized. Beginning from 11-10, the process repeats as did for 11-1 through 11-9. Note the pilot transmit power level used at 11-10 is kept the same as the power controlled level used at 11-5, if no re-transmissions is needed, otherwise, if re-transmissions is needed, an additional positive power offset, such as 1 dB, from the power controlled level used at 11-5 might be applied to both pilot and data code channels.

The re-transmission of the frame at burst 11-10 is either a plain re-transmission, or transmitting additional error control parity bits for stronger decoding together with the first transmission at 11-5. Either way, at the base station, the decoding of re-transmission at 11-10 may be performed jointly with signals received for the burst 11-5. The re-transmission is not acknowledged and if it is still decoded with error, the frame will be discarded. The time compression ratio for the re-transmission may be determined by time compression ratio control bits received at 11-4, or may be determined by new time compression ratio control bits transmitted together with a negative acknowledgement at 11-8.

The power control bits might have 4 bits that can adjust up to +/−8 dB with resolution of 1 dB in a single adjustment. Other implementations are possible.

During transmission, the handset transmitter is turned on, and during the non-transmission periods, the transmitter is turned off in the mobile station, to reduce battery consumption. Note that a positive acknowledgement may be omitted and is interpreted as positive by default. A negative acknowledgement can be implied by receiving non-null contents of time compression ratio control bits.

The above paragraphs described time compressed transmission in the reverse (uplink). In fact, the forward link (downlink) transmission may also use higher channel transmission rates than the source data rates, so that time duration for transmission is also compressed. The receiver is turned on only during the periods the scheduled forward link (downlink) transmission happens, to achieve longer talk time. The power control to the forward (down) link signal is based on handset feedback based on forward link signal quality. The time compression ratio control is based on the detection of the forward (down) link load level estimation performed at the base station itself. The receiving and the transmitting periods are scheduled so that the handset receiving period can receive the power control, time compression ratio control and/or acknowledge from the base station with enough time to prepare the next handset transmission. These arrangements also apply to the following examples.

Note the methods of network load level estimation or network remaining capacity estimation for both up or down links performed at the base station, depending on which link the time compression ratio control information is generated for, are implementation specific. There exist known arts to accomplish the processing.

The time compression ratio control can be selected based on the media properties (voice only or video or both, etc.) and the source data rates. For forward (down) link, base station knows the incoming media information. For reverse (up) link, the media information will be passed to base station through messages during call set up procedures, and/or through messages exchanged during the call.

Second Specific Example

Figure 12:
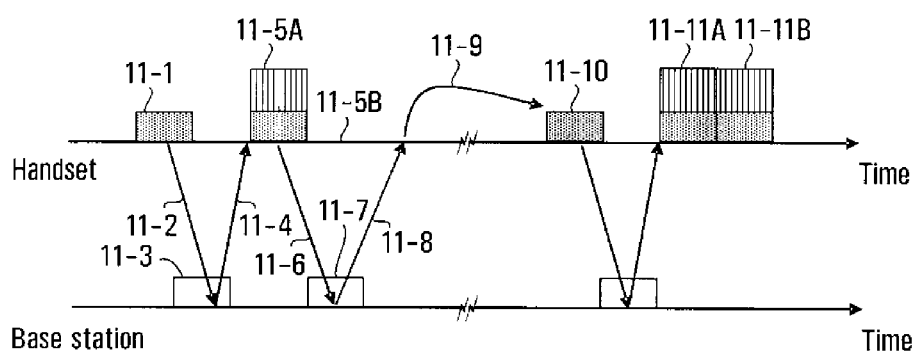

Referring now to FIG. 12, shown is a signaling diagram for a second specific example. The second specific example is similar to the first specific example except that the re-transmission is power controlled. After the first voice frame transmission 11-5A, there is no previous voice frame to be re-transmitted, therefore, burst 11-5B does not exist. The position 11-11A is the transmission of second voice frame, 11-11B is the re-transmission of 11-5A if determined to be needed, otherwise, 11B does not exist. Note the order of new transmission and re-transmission of previous frame (11-11A and 11-11B) can be exchanged, i.e., the first is re-transmission, the second is new transmission—when re-transmission does not exist, new transmission happens at the second position. Alternatively, when no re-transmission, new transmission takes the first burst (11-5A or 11-11A) without a second burst to follow (11-5B or 11-11B); when there is re-transmission, the new transmission takes the second burst (11-5B or 11-11B) after the first (11-5A or 11-11A). Aspects related to time compression ratio control, acknowledge, re-transmission, etc. are similar to those in the first specific example.

Third Specific Example

Figure 13:
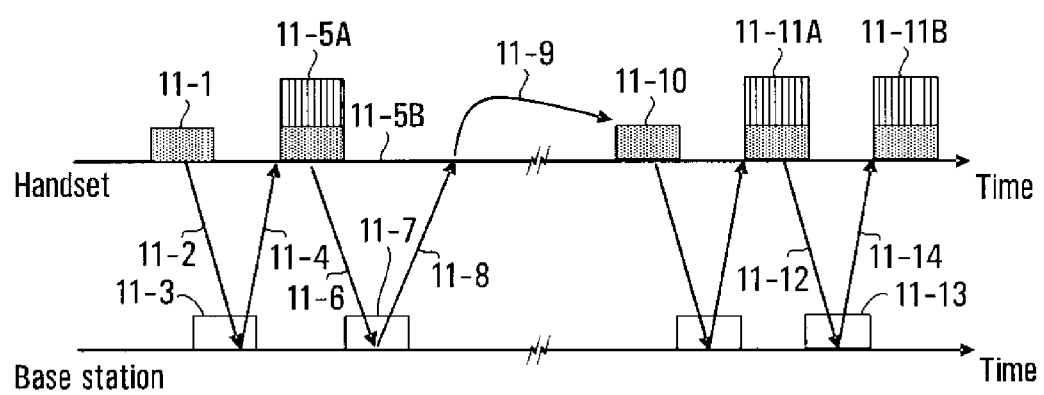

Referring now to FIG. 13, shown is a signaling diagram for a third specific example. The change from the second specific example is that, the re-transmission and the next frame 11-5A and 11-5B, or 11-11A and 11-11B are separated by a time gap for power control round trip delay, so that 11-5B (in the figure it does not exists) and 11-11B are power controlled based on received power of 11-5A and 11-11A at the base station, respectively. The transmitted power of 11-11A propagates 11-12 to the base station, and received by the base station to determine 11-13 the power control bits, transmitted hack to handset 11-14 to set the new transmitted power for 11B. Between the transmitting slots, e.g., between 11-1 and 11-5A, 11-5A and 11-5B, 11-5B and 11-10, 11-10 and 11-11A, 11-11A and 11-11B, 11-11B and . . . the handset transmitter is turned of, like in the first and second specific examples, to save battery. Again, aspects related to time compression ratio control, acknowledge, re-transmission, etc. are similar to those in the first specific example.

In the specific examples described with reference to FIGS. 11 through 13, the feedback control can further include additional adaptive control information, including modulation and coding configuration and re-transmission format configuration. Therefore, coding, modulation, the effective transmission data rate, transmission duration, transmission interval, transmission time position, number of allowed re-transmission, spreading factor (for CDMA case) are all possible to be adaptive to channel conditions, network load levels and media properties. Many of these parameters may also affect the time compression ratio.

To increase channel capacity and spectrum efficiency, between multiple users, the transmission time slots are spread out to avoid (or at least reduce) overlays. Unlike TDMA, in CDMA time-compressed transmission, some overlays in the same cell/sector are allowed. The base station shall assign the slots among users. Predetermined transmission slots or pseudo-random slots can be used. In OFDMA based system, users in the same cell might not time-overlay the transmission bursts over any sub-carriers.

Since the time compression ratio can be determined by spreading factor, number of assigned sub-carriers, or more generally through parameters and methods of coding and modulation, adaptively adjusting time compression ratio through such settings are considered as within the scope of this disclosure. In other words, the adaptive control to time compression ratio can be direct or indirect.

Numerous modifications and variations of the present application are possible in light of the above teachings. It is therefore to be understood that within the scope of the appended claims, the application may be practiced otherwise than as specifically described herein.

I claim:

1. A method comprising:
transmitting data in real-time using adaptive time compression by transmitting data blocks such that a ratio of time elapsed for transmitting each data block to time elapsed for generating the data block from a source is adaptive based on at least an estimation of network load;
wherein the adaptive time compression adapts a duty cycle of the data being transmitted in real-time while maintaining same net data throughput from the source.

2. The method of claim 1 wherein transmitting the data in real-time using adaptive time compression comprises at least one of:
transmitting the data in real-time using adaptive time compression over a CDMA-based air interface;
transmitting the data in real-time using adaptive time compression over a DSSS-based air interface; and
transmitting the data in real-time using adaptive time compression over an OFDM-based air interface.

3. The method of claim 1 for execution by a mobile device, the method further comprising:
receiving an indication of the ratio;
wherein transmitting the data in real-time using adaptive time compression comprises applying the ratio as received when transmitting the data.

4. The method of claim 3 wherein the indication of the ratio comprises at least two of: an encoding configuration, an encoding rate, a symbol repetition factor, a puncturing/extending configuration, a puncturing/extending factor, a spreading configuration, a spreading factor, a modulation configuration, a level/constellation size of modulation, a number of sub-carriers, and an index that points to a predetermined combination of parameter values.

5. The method of claim 3 further comprising:
transmitting an indication of at least one media property of the data, the media property being any of data rate, latency tolerance, packet/frame size, total duration of use or an estimate thereof, grade of service, and billing class;
wherein the ratio is based on at least the estimation of network load and the at least one media property of the data.

6. The method of claim 3 further comprising:
transmitting an indication of a battery level of the mobile device;
wherein the ratio is based on at least the estimation of network load and the battery level of the mobile device.

7. The method of claim 3 further comprising:
transmitting an indication of an estimation of channel quality;
wherein the ratio is based on at least the estimation of network load and the estimation of channel quality.

8. The method of claim 3 further comprising:
placing circuitry of the mobile device in a low power mode while in-between the data blocks.

9. The method of claim 1 for execution by a wireless network, the method further comprising:
determining the ratio based on at least the estimation of network load;
wherein transmitting the data in real-time using adaptive time compression comprises applying the ratio as determined when transmitting the data.

10. The method of claim 9 further comprising:
determining the estimation of network load based on forward-link load.

11. The method of claim 9 further comprising:
determining at least one media property of the data, the media property being any of data rate, latency tolerance, packet/frame size, total duration of use or an estimate thereof, grade of service, and billing class;
wherein the ratio is determined based on the estimation of network load and the at least one media property of the data.

12. The method of claim 9 further comprising:
receiving an indication of a battery level of a mobile device;
wherein the ratio is determined based on at least the estimation of network load and the battery level of the mobile device.

13. The method of claim 9 further comprising:
determining an estimation of channel quality;
wherein the ratio is determined based on at least the estimation of network load and the estimation of channel quality.

14. The method of claim 9 further comprising:
transmitting to a mobile device an indication of the ratio.

15. A non-transitory computer readable medium having computer executable instructions stored thereon for execution on a processor so as to implement a method comprising:
transmitting data in real-time using adaptive time compression by transmitting data blocks such that a ratio of time elapsed for transmitting each data block to time elapsed for generating the data block from a source is adaptive based on at least an estimation of network load;
wherein the adaptive time compression adapts a duty cycle of the data being transmitted in real-time while maintaining same net data throughput from the source.

16. A mobile device comprising:
a wireless access radio configured to transmit data in real-time using adaptive time compression by transmitting data blocks such that a ratio of time elapsed for transmitting each data block to time elapsed for generating the data block from a source is adaptive based on at least an estimation of network load;
wherein the adaptive time compression adapts a duty cycle of the data being transmitted in real-time while maintaining same net data throughput from the source.

17. A network node comprising:
a processor; and
an adaptive time compression function configured to transmit data in real-time using adaptive time compression by transmitting data blocks such that a ratio of time elapsed for transmitting each data block to time elapsed for generating the data block from a source is adaptive based on at least an estimation of network load;
wherein the adaptive time compression adapts a duty cycle of the data being transmitted in real-time while maintaining same net data throughput from the source.

18. A method for execution in a wireless network, the method comprising:
determining for a mobile device capable of transmitting data in real-time with data blocks a time compression ratio based on at least an estimation of network load, the time compression ratio being a ratio of time elapsed for transmitting each data block to time elapsed for generating the data block from a source such that a duty cycle of the data transmitted in real-time is adapted while maintaining same net data throughput from the source;
transmitting to the mobile device an indication of the time compression ratio; and
receiving data transmitted in real-time using adaptive time compression according to the time compression ratio.

19. The method of claim 18 wherein the indication of the time compression ratio comprises at least two of: an encoding configuration, an encoding rate, a symbol repetition factor, a puncturing/extending configuration, a puncturing/extending factor, a spreading configuration, a spreading factor, a modulation configuration, a level/constellation size of modulation, a number of sub-carriers, and an index that points to a predetermined combination of parameter values.

20. The method of claim 18 wherein determining the time compression ratio comprises negotiating with the mobile device for the time compression ratio.

21. The method of claim 18 further comprising:
determining the estimation of network load based on at least one of forward-link load and reverse-link load.

22. The method of claim 18 further comprising:
receiving an indication of at least one media property of the data, the media property being any of data rate, latency tolerance, packet/frame size, total duration of use or an estimate thereof, grade of service, and billing class;
wherein the time compression ratio is determined based on at least the estimation of network load and the at least one media property of the data.

23. The method of claim 18 further comprising:
receiving an indication of the battery level of the mobile device;
wherein the time compression ratio is determined based on at least the estimation of network load and the battery level of the mobile device.

24. The method of claim 18 further comprising:
determining an estimation of channel quality;
wherein the time compression ratio is determined based on at least the estimation of channel quality.

25. A non-transitory computer readable medium having computer executable instructions stored thereon for execution on a processor so as to implement a method comprising:
determining for a mobile device capable of transmitting data in real-time with data blocks a time compression ratio based on at least an estimation of network load, the time compression ratio being a ratio of time elapsed for transmitting each data block to time elapsed for generating the data block from a source such that a duty cycle of the data transmitted in real-time is adapted while maintaining same net data throughput from the source;

transmitting to the mobile device an indication of the time compression ratio; and receiving data transmitted in real-time using adaptive time compression according to the time compression ratio.

26. A network node comprising:

a processor; and a time compression determination function configured to:

determining for a mobile device capable of transmitting data in real-time with data blocks a time compression ratio based on at least an estimation of network load, the time compression ratio being a ratio of time elapsed for transmitting each data block to time elapsed for generating the data block from a source such that a duty cycle of the data transmitted in real-time is adapted while maintaining same net data throughput from the source;

transmitting to the mobile device an indication of the time compression ratio; and receiving data transmitted in real-time using adaptive time compression according to the time compression ratio.

* * * * *